United States Patent
Keyl

(10) Patent No.: US 10,030,817 B2
(45) Date of Patent: Jul. 24, 2018

(54) HYDRAULIC CONTROL ARRANGEMENT FOR A PLURALITY OF ACTUATORS

(71) Applicant: Robert Bosch GmbH, Stuttgart (DE)

(72) Inventor: Christoph Keyl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 482 days.

(21) Appl. No.: 14/698,553

(22) Filed: Apr. 28, 2015

(65) Prior Publication Data
US 2015/0308625 A1   Oct. 29, 2015

(30) Foreign Application Priority Data
Apr. 29, 2014 (DE) .......................... 10 2014 208 019

(51) Int. Cl.
| | | |
|---|---|---|
| *F17D 3/01* | (2006.01) | |
| *F16K 11/02* | (2006.01) | |
| *F15B 11/16* | (2006.01) | |

(52) U.S. Cl.
CPC ............... *F17D 3/01* (2013.01); *F15B 11/16* (2013.01); *F16K 11/02* (2013.01);
(Continued)

(58) Field of Classification Search
CPC .... F15B 11/162; F15B 11/165; F15B 13/022; F15B 13/07; F15B 2211/30535; F15B 2211/30595
(Continued)

(56) References Cited

U.S. PATENT DOCUMENTS

| | | | | |
|---|---|---|---|---|
| 3,465,519 A | * | 9/1969 | Hubbard | ................. F15B 11/16 137/115.03 |
| 3,908,375 A | * | 9/1975 | Young | ................... F15B 11/162 60/422 |
| 3,987,623 A | * | 10/1976 | Bianchetta | ............ E02F 9/2221 60/422 |
| 7,089,733 B1 | * | 8/2006 | Jackson | ................ F15B 11/165 60/422 |
| 7,284,371 B2 | | 10/2007 | Toji et al. | |

(Continued)

OTHER PUBLICATIONS

Noack, Dr. Steffen, Hydraulik in mobilen Arbeitmaschinen (Hydraulics in Mobile Working Machines), May 2001, p. 83, Section 10.4.2 Erweiterte Schaltung (Advanced Circuit), 2.Auflage (edition) 2001, Omegon Fachliteratur, Ditzingen, Germany (8 pages).

(Continued)

*Primary Examiner* — Michael Leslie
*Assistant Examiner* — Matthew Wiblin
(74) *Attorney, Agent, or Firm* — Maginot, Moore & Beck LLP

(57) ABSTRACT

A control arrangement for supplying a plurality of hydrostatic actuators includes a pump with an output connected to a circulating line that opens into a tank. The control arrangement has a metering port and an individual pressure compensator for each actuator. The individual pressure compensators are connected in series by the circulating line. Some of the pressure medium are configured to be branched off from the circulation channel for the respective actuator by the individual pressure compensators and fed to the metering port disposed downstream of the individual pressure compensator. The pressure medium that is not required is forwarded from each individual pressure compensator into the circulating line and is fed back from the last individual pressure compensator to the tank by the circulating line. The actuators are prioritized based on the order of their individual pressure compensators and move independently of the load pressure without expensive load sensing lines.

13 Claims, 2 Drawing Sheets

(52) U.S. Cl.
CPC ............ *F15B 2211/20546* (2013.01); *F15B 2211/3053* (2013.01); *F15B 2211/30535* (2013.01); *F15B 2211/3111* (2013.01); *F15B 2211/3127* (2013.01); *F15B 2211/351* (2013.01); *F15B 2211/353* (2013.01); *F15B 2211/40507* (2013.01); *F15B 2211/40515* (2013.01); *F15B 2211/41509* (2013.01); *F15B 2211/41554* (2013.01); *F15B 2211/41563* (2013.01); *F15B 2211/45* (2013.01); *F15B 2211/455* (2013.01); *F15B 2211/46* (2013.01); *F15B 2211/52* (2013.01); *F15B 2211/6306* (2013.01); *F15B 2211/6652* (2013.01); *F15B 2211/6654* (2013.01); *F15B 2211/71* (2013.01); *F15B 2211/781* (2013.01)

(58) Field of Classification Search
USPC ...................................... 60/422; 91/446, 468
See application file for complete search history.

(56) References Cited

U.S. PATENT DOCUMENTS

| | | | |
|---|---|---|---|
| 2007/0006580 A1* | 1/2007 | Hesse | E02F 9/2296 60/452 |
| 2008/0092960 A1* | 4/2008 | Manecke | F16K 37/0033 137/554 |
| 2011/0158830 A1 | 6/2011 | Cheong | |
| 2013/0047834 A1* | 2/2013 | Lougheed | E02F 9/2228 91/516 |

OTHER PUBLICATIONS

Rexroth Bosch Group; LUDV control block of sandwich place design; Data Sheet 64125; Feb. 2011; 24 pages; Bosch Rexroth AG, Germany.
Rexroth Bosch Group; Load-sensing control block in sandwich plate design SB23-M; Data Sheet 66130; Aug. 2013; 24 pages; Bosch Rexroth AG, Germany.

* cited by examiner

HYDRAULIC CONTROL ARRANGEMENT FOR A PLURALITY OF ACTUATORS

This application claims priority under 35 U.S.C. § 119 to patent application no. DE 10 2014 208 019.3, filed on Apr. 29, 2014 in Germany, the disclosure of which is incorporated herein by reference in its entirety.

BACKGROUND

The disclosure relates to a hydraulic control arrangement for a plurality of hydrostatic actuators or loads of a mobile working machine with neutral circulation.

With such control arrangements the different actuators are supplied by means of a respective valve arrangement from a common circulating line that connects a pump to a tank of the control arrangement. If no actuator requires pressure medium, a continuously circulating volumetric flow from the pump to the tank—the so-called neutral circulation—is possible with minimal energy consumption. Therefore the pump can be implemented as a constant pump that is simple from the equipment technology and control technology viewpoints.

With control arrangements with circulating lines, a first principle is known by which the volumetric flows of the different actuators that may be required are branched from the circulating line in parallel with each other. The publication "Hydraulics in Mobile Working Machines" of 27 Jan. 2014 of the applicant shows such a control arrangement in section 10.4.2. Its circulating line runs in a no circuit past the different valve arrangements by means of a (common) pressure compensator, which is opened in the event of non-operated actuators in order to thus enable the low-resistance neutral circulation.

According to a second principle, for neutral circulation the circulating line runs through the valve arrangements of the different actuators so that the valve arrangements are connected in series with each other.

The publication "Load-Sensing Control Block of Sandwich Plate Construction SB23-M" RD 66130 of the applicant of August 2013 shows said second principle with a constant pump and with only one actuator on page 3/24 on the left at the bottom. There by means of a directional control valve, in which the metering port for determining the speed of the actuator is integrated, the forwarding of the volumetric flow in neutral circulation is also enabled if the actuator is not to be supplied. By the continuous variability of the directional control valve, forwarding of some of the volumetric flow delivered by the constant pump that is not required by the actuator into the neutral circulation is possible if the actuator is to be moved slowly, for example.

In the documents U.S. Pat. No. 7,284,371 B2 and US 2011/0158830 A1, control arrangements for a plurality of actuators are shown that have neutral circulation that is passed through the valve arrangements of the different actuators. More precisely, the neutral circulation passes through respective directional control valves, whose valve pistons are in a central position (open center) in this case. Even if the neutral circulation of such control arrangements enables the use of a constant pump, variable pumps are provided with both of said documents.

Furthermore, it is known from the prior art to integrate an individual pressure compensator in each valve arrangement in the case of a control arrangement for a plurality of actuators of a mobile working machine having a variable pump. More precisely, an individual pressure compensator is associated with each metering port, so that a respective flow regulating valve is formed. This enables a volumetric flow to the respective actuator that depends on the opening cross-section of the metering port and that is independent of the load pressure of the respective actuator, whereby a high level of user friendliness results for the driver of the mobile working machine during the operation and control of the actuator.

In the publication "LUDV-Control Block of Sandwich Plate Construction" RD 64125 of the applicant of February 2011 on page 4/24 at the top, and in the already mentioned publication "Load-Sensing-Control Block of Sandwich Plate Construction SB23-M" RD 66130 on page 9/24 on the right, such a valve arrangement with an individual pressure compensator for supplying an associated actuator is shown in each case. Each valve arrangement including the individual pressure compensator is combined in a valve disc, a plurality of which are grouped in a control arrangement. In both documents a common pump line of the control arrangement runs through each valve disc, from which a respective channel branches to the valve arrangement of the respective valve disc.

It is a disadvantage of such control arrangements for a plurality of actuators that so-called load sensing lines are necessary, in which the pressure of the most highly loaded actuator is determined Depending on said pressure, a variable pump that is not shown is regulated so that the same only delivers the required quantity of pressure medium. In the first-mentioned publication said pressure is also needed for regulation of the pressure compensators.

By contrast, the object of the disclosure is to provide a control arrangement for a plurality of actuators with which the determination of the pressure of the most highly loaded actuator by means of load sensing lines and changeover valves suitably extending across the valve arrangements and the corresponding transmission to the pump and possibly to the individual pressure compensators can be dispensed with.

SUMMARY

This object is achieved by a control arrangement for a plurality of actuators of a mobile working machine with the features of the disclosure.

The hydraulic control arrangement is used to supply a plurality of hydrostatic actuators and has a pump whose output is connected to a circulating line that opens into a tank. Furthermore, the control arrangement has a metering port and an individual pressure compensator for each actuator. According to the disclosure, the individual pressure compensators are connected in series by means of the circulating line, wherein some of the pressure medium can be branched off from the circulation channel for the respective actuator by means of the individual pressure compensators and can be fed to the metering port disposed downstream of the individual pressure compensator. The pressure medium that is not required can thus be passed from each individual pressure compensator into the circulating line. The pressure medium that is not required is fed back to the tank from the last individual pressure compensator by means of the circulating line. Prioritization of the actuators results from the order of their individual pressure compensators: the individual pressure compensators closer to the pump are preferred. The actuators also move independently of the load pressure without expensive load sensing lines; a certain opening of the metering port thus causes a certain speed of the actuator.

An input and a first output of the individual pressure compensator are particularly preferably connected to the circulating line, wherein pressure medium can be branched off to the metering port by means of a second output of the individual pressure compensator. A continuously variable valve body of the individual pressure compensator is acted upon by the input pressure of the metering port towards a flow position, in which the input is connected to the first output and the second output is blocked. By contrast, the valve body of the individual pressure compensator is acted upon by the output pressure of the metering port towards a branching off position in which the input is connected to the second output and the first output is blocked. The system pressure of the pump is adjusted by the individual pressure compensator of the actuator with the highest load pressure at its flow control edge. The valve body of the individual pressure compensator is acted on by a spring in the direction of the flow position.

With a particularly preferred energy-saving development, the pump is a variable pump. The same is controlled according to demand instead of controlling the pressure difference between the pump line or circulating line and the load sensing signal of the variable pump according to the prior art. Furthermore, the hydraulic losses are reduced because the pump pressure can be set to the required value without a $\Delta p$ provision that has to be built up on the individual pressure compensators.

According to one development, a transport volume of the variable pump can be adjusted by means of an electrical control device and by means of an electrical actuator, which adjusts a control valve of the variable pump, for example.

For this purpose, according to a first version the volumetric flow demands of the actuators can be stored in the electrical control device as a function of a respective target signal generated by the operator and transmitted to the control device. The control device can then calculate the total demand of all loads of the control arrangement depending on the target signals and can adjust the delivery volumetric flow of the variable pump.

For this purpose, according to a second version the volumetric flow demands of the actuators can be stored in the electrical control device depending on the adjustment of the valve bodies of the associated metering ports, wherein position sensors are provided on the valve bodies of the metering ports. The control device can then calculate the total demand of all loads of the control arrangement depending on the adjustment of the valve bodies of the metering ports and can adjust the delivery volumetric flow of the variable pump.

With a preferred development, the transport volume of the variable pump can be adjusted depending on a back pressure in front of a measurement aperture, which is disposed in the circulating line between the last individual pressure compensator and the tank. Further loads can then be supplied by means of the control arrangement according to the disclosure by means of further metering ports that are not known and stored in the electrical control device. For example, this can be carried out by using Power Beyond or mechanical directional control valves.

For this, according to a first version a pressure sensor, which is electrically connected to the electrical control device, can be connected to the circulating line between the last individual pressure compensator and the measurement aperture.

Alternatively, according to a second version the transport volume of the variable pump can be directly adjusted hydraulically by means of the back pressure.

A particularly preferred development of the control arrangement according to the disclosure has a directional control valve for each actuator that is mechanically coupled to the metering port or that is integrated within the same. The directional control valve can operate as a load sensing directional control valve according to the prior art if there is sufficient pump pressure.

The metering port together with the directional control valve is preferably operated electrically.

With a preferred configuration, the directional control valve has two working connections that can be connected to the actuator, i.e. an input and a tank connector. Furthermore, the directional control valve has a blocking position (closed center) and two working positions for supplying the actuator in two different directions. The metering port is coupled to the directional control valve such that it opens a passage for both working positions of the directional control valve, and such that it shuts off the passage in the blocking position of the directional control valve.

In order to also allow the actuators to have a free movement position, the above-mentioned directional control valve can be developed into a 4/4-directional control valve with a free movement position, wherein the metering port is coupled to the 4/4-directional control valve such that it blocks the passage in the free movement position of the 4/4-directional control valve.

A working line in the direction from the metering port to the input of the directional control valve can be discharged into the tank in the blocking position of the directional control valve, so that in the blocking position of the directional control valve the individual pressure compensator can pass the entire pressure medium into the circulating line so that it can be passed to other actuators.

If the directional control valve is developed into the 4/4-directional control valve with a free movement position, the working line must also be able to be discharged into the tank in the free movement position of the 4/4-directional control valve so that the individual pressure compensator can pass the entire pressure medium into the circulating line in the free movement position of the directional control valve.

The discharging preferably takes place by means of the working line via a relief valve connected thereto, which is mechanically coupled to the directional control valve or integrated within the same in a manner that is simple from the equipment technology viewpoint.

The relief valve together with the directional control valve is preferably operated electrically.

With a preferred development, a non-return valve is provided in the working line between a branch to the relief valve and the input. Thus no pressure medium can be forced back from the actuator through the directional control valve, the metering port and the individual pressure compensator into the circulating line.

The individual pressure compensator and the metering port and possibly the directional control valve and possibly the relief valve and possibly the non-return valve are preferably accommodated in a valve disc. The valve discs are combined into a valve block of the control arrangement in a modular manner.

BRIEF DESCRIPTION OF THE DRAWINGS

Different exemplary embodiments of the disclosure are described in detail below using the figures. In the figures

DETAILED DESCRIPTION

Figure 1:
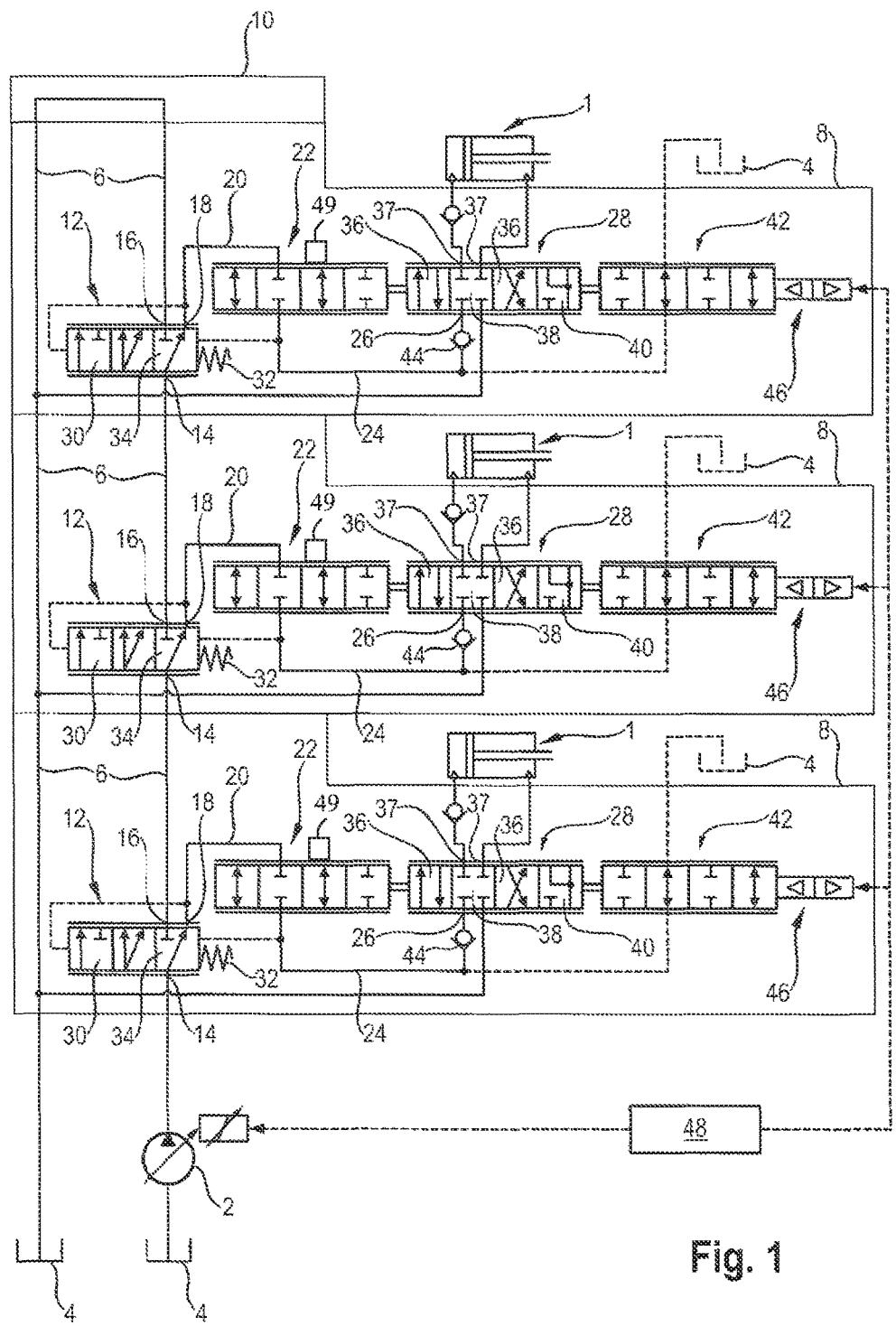
FIG. 1 shows a first exemplary embodiment of the control arrangement according to the disclosure with three actuators.

FIG. 1 shows a first exemplary embodiment of the control arrangement according to the disclosure for supplying three different bidirectionally operable actuators 1 that are in the form of differential cylinders. The control arrangement has a variable pump 2 by which pressure medium is sucked out of a tank 4 and fed back to the tank 4 by means of a circulating line 6.

The circulating line 6 is formed of channel segments of different valve discs 8, of which three are combined into a valve block of the control arrangement. The three valve discs 8 can thus be referred to and distinguished as the valve disc 8 close to the pump, the central valve disc 8 and the valve disc 8 remote from the pump. A termination element 10 in which a segment of the circulating line 6 is formed is provided on the valve disc 8 remote from the pump.

A continuously variable individual pressure compensator 12 is provided in each valve disc 8, wherein the three individual pressure compensators 12 are connected sequentially in series in a segment of the circulating line 6 in the direction from the variable pump 2 to the termination element 10. Each individual pressure compensator 12 has an input 14, a first output 16 and a second output 18. The first output 16 opens into the circulating line 6 in each case, whilst the second output 18 is connected by means of a working line 20, a metering port 22 and a further working line 24 to an input 26 of a directional control valve 28 in the form of a 4/4-directional control valve. The working line 20, the metering port 22, the further working line 24 and the directional control valve 28 are accommodated in the valve disc.

A valve body of the individual pressure compensator 12 is acted upon by the pressure of the working line 20 towards an end position, which is referred to as the flow position 30, in which the input of the individual pressure compensator 12 is connected to its first output 16. Furthermore, the valve body of the individual pressure compensator 12 is acted upon by the pressure of the working line 24 and by the force of a spring 32 towards an end position that is referred to as a branching off position 34. In said position the input 14 of the individual pressure compensator 12 is connected to its second output 18.

The directional control valve 28 has two working positions 36, by means of which the actuator 1 can be moved in a different direction. In the exemplary embodiment shown in FIG. 1, a load-holding valve in the form of a non-return valve is provided in one of the two working lines, by means of which the working connections 37 of the directional control valve 28 are connected to the actuator 1.

The directional control valve 28 is shown in a central blocking position 38 (closed center). In this case the input 26, the two working connections 37 and a tank connector of the directional control valve 28 are shut off. Furthermore, the directional control valve 28 has a free movement position 40 in which the two working connections 37 and the tank connector are connected to each other so that the actuator 1 can move freely. For this purpose the input 26 of the directional control valve 28 is shut off.

Each valve disc 8 has a relief valve 42, by means of which the working line 24 can be discharged to the tank 4. Furthermore, a non-return valve 44, which exclusively allows a volumetric flow to the directional control valve 28, is provided in the working line 24 between the connector of the relief valve 42 and the input 26 of the directional control valve 28.

The valve bodies of the metering port 22 and of the directional control valve 28 and of the relief valve 42 are continuously variable and are coupled to each other, so that all three valve bodies always move with each other. For this purpose an electrical actuator 46 is provided that is supplied with electrical power by means of a common electrical control device 48. The transport volume of the variable pump 2 is electrically adjusted by means of the electrical control device 48—for example by means of an electroproportional regulator.

In one embodiment, the volumetric flow demands of the actuators 1 are stored in the electrical control device 48 as a function of a respective target signal generated by the operator and transmitted to the control device 48. The control device then calculates the total demand of all loads of the control arrangement depending on the target signals and adjusts the delivery volumetric flow of the variable pump 2.

In another embodiment, the volumetric flow demands of the actuators 1 are stored in the electrical control device 48 depending on the adjustment of the valve bodies of the associated metering ports 22. In this embodiment, position sensors 49 are provided on the valve bodies of the metering ports 22 to detect the adjustment of the valve bodies. The control device 48 then calculates the total demand of all loads of the control arrangement depending on the adjustment of the valve bodies of the metering ports 22 and adjusts the delivery volumetric flow of the variable pump 2.

The directional control valve 28 has the four described switching positions 36, 38, 40, wherein the metering port 22 is designed such that it opens in the two working positions 36 of the directional control valve 28 and shuts off in the blocking position 38 and in the free movement position 40. The relief valve 42 is designed similarly, wherein the same shuts off in the two working positions 36 of the directional control valve 28 and opens to the tank 4 in the blocking position 38 and in the free movement position 40.

Pressure medium is taken from the circulating line 6 by means of the three individual pressure compensators 12 depending on the demand of the actuator 1, which is defined by means of the opening of its metering port 22, wherein the individual pressure compensator 12 close to the pump or the valve disc 8 close to the pump and hence the actuator 1 close to the pump has the highest priority, whereas the individual pressure compensator 12 remote from the pump or the valve disc 8 remote from the pump and hence the actuator 1 remote from the pump has the lowest priority.

The system pressure is adjusted by the individual pressure compensator 12 of the actuator 1 with the highest load pressure at its forward flow control edge. The total demand for pressure medium of the control arrangement is known from the sum of the target values for the directional control valves 28 and for the metering ports 22. The variable pump 2 is adjusted by means of the electrical control device 48 such that there is only a small excess of pressure medium. The same is fed back to the tank 4 by means of the termination element 10.

If an actuator 1 is operated with low pressure after the valve disc 8 determining the system pressure, its individual pressure compensator 12 throttles the pressure medium volumetric flow of the circulating line 6 again. If an actuator 1 is operated with a low pressure before the valve disc 8 determining the system pressure, its individual pressure compensator 12 regulates the control pressure drop at its other control edge.

If the actuators 1 are not being operated, the pressure of the neutral circulation in the circulating line 6 corresponds to the equivalent of the springs 32 of the individual pressure compensators 12. Because with the first exemplary embodiment according to FIG. 1 the demand for pressure medium of all actuators 1 is known from the target values of the respective metering ports 22, no further sensors are necessary. The control arrangement according to FIG. 1 is suitable for valves distributed on the mobile working machine because no control lines are necessary.

Should the maximum adjustable delivery volumetric flow of the variable pump 2 not be sufficient to satisfy all demands, the actuators 1 are prioritized according to the order of the valve discs 8—starting with the variable pump 2.

Figure 2:
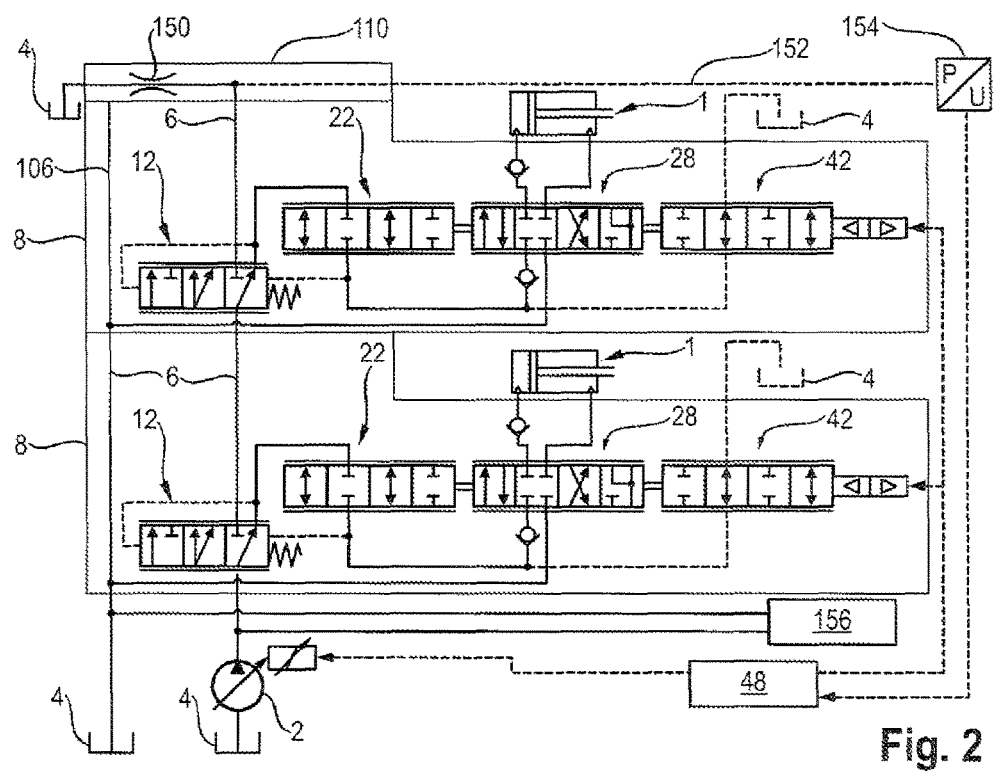
FIG. 2 shows a second exemplary embodiment of the control arrangement according to the disclosure with two actuators (aperture and return of the back pressure to the variable pump by means of the pressure sensor)

FIG. 2 shows a second exemplary embodiment of the control arrangement according to the disclosure, wherein only the minimum number of two valve discs 8 is provided. The valve discs 8 correspond to those of the first exemplary embodiment according to FIG. 1. Thus the channels within the valve discs 8 forming the circulating line 6 also correspond to those of the valve discs 8 of the first exemplary embodiment. Only the channel segment 106 of the valve disc 8 remote from the pump that is provided for the return feed does not carry the flow of the pressure medium of the circulation, because the termination element 110 of the second exemplary embodiment is changed relative to that of the first exemplary embodiment. A measurement aperture 150 is provided in the termination element 110, wherein an output of the termination element 110 is fed directly to the tank 4 downstream of the measurement aperture 150. A pressure sensor 154 is connected to the circulating line 6 upstream of the measurement aperture 150 by means of a control line 152. Said pressure sensor detects the back pressure (between the individual pressure compensators 12 of the valve disc 8 remote from the pump) before the measurement aperture 150 and signals the same to the electrical control device 48. It is thus possible to supply further loads 156 with the control arrangement according to the disclosure that are connected to the circulating line 6 on a high pressure side or pump output side and on a low pressure side.

The back pressure before the measurement aperture 150 is continuously measured by the pressure sensor 154 and the delivery rate of the variable pump 2 is regulated by means of the electrical control device 48 such that it always remains at as low a value as possible.

Figure 3:
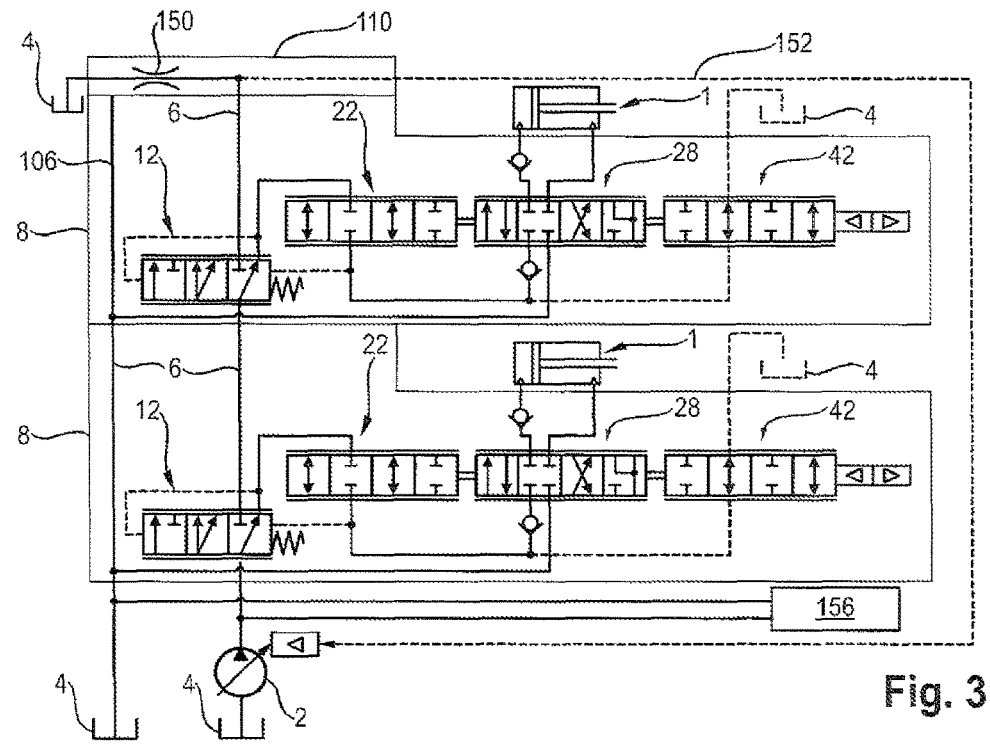
FIG. 3 shows a third exemplary embodiment of the control arrangement according to the disclosure with two actuators (aperture and direct return of the back pressure to the variable pump by means of the pressure sensor).

FIG. 3 shows a third exemplary embodiment of the control arrangement according to the disclosure. The same corresponds substantially to the second exemplary embodiment according to FIG. 2. It differs therefrom in that the back pressure before the measurement aperture 150 is fed by means of the control line 152 directly to a hydraulic adjustment device (e.g. an actuating piston) of the variable pump 202. It is thus also possible to regulate the variable pump 202 optimally without knowing the total demand of the actuators 1 and loads 156.

Differently from the exemplary embodiments shown, the valve bodies of the metering port 22, of the directional control valve 28 and of the relief valve 42 can also be made in one piece.

Differently from the exemplary embodiments shown, the control arrangement according to the disclosure can also comprise more than two or three valve discs for supplying a correspondingly greater number of actuators.

A control arrangement is disclosed that is used to supply a plurality of hydrostatic actuators. It has a pump whose output is connected to a circulating line that opens into a tank. Furthermore, the control arrangement has a metering port and an individual pressure compensator for each actuator. The individual pressure compensators are connected in series here by means of the circulating line. Some of the pressure medium can be branched off from the circulation channel for the respective actuators by means of the individual pressure compensators and fed to the metering ports disposed downstream of the individual pressure compensators. The pressure medium that is not required can thus be forwarded from each individual pressure compensator into the circulating line. The pressure medium that is not required is fed back to the tank from the last individual pressure compensator by means of the circulating line. A prioritization of the actuators results from the order of their individual pressure compensators: the individual pressure compensators closer to the pump are given preference. The actuators also move independently of the load pressure without expensive load sensing lines; i.e. a certain opening of the metering port causes a certain speed of the actuator.

REFERENCE CHARACTER LIST 1 actuator
2; 202 variable pump
4 tank
6 circulating line
8 valve discs
10; 110 termination element
12 individual pressure compensator
14 input
16 first output
18 second output
20 working line
22 metering port
24 working line
26 input
28 directional control valve
30 flow position
32 spring
34 branching off position
36 working position
38 blocking position
40 free movement position
42 relief valve
44 non-return valve
46 electrical actuator
48 electrical control device
106 channel segment
150 measurement aperture
152 control line
154 pressure sensor
156 further loads

What is claimed is:

1. A hydraulic control arrangement for supplying a plurality of hydrostatic actuators, comprising:
   a circulating line that opens into a tank;
   a pump with an output that is connected to the circulating line, the pump configured to supply pressure medium to the circulating line in a flow direction;
   a metering orifice and an individual pressure compensator configured for each actuator of the plurality of hydrostatic actuators; and
   a directional control valve that is mechanically coupled to or is integrated within the metering orifice, the directional control valve configured to move with the metering orifice,
   wherein the individual pressure compensators are connected in series by the circulating line,
   wherein the corresponding individual pressure compensator for each actuator is disposed intermediate the circulating line and the corresponding metering orifice in the flow direction such that the pressure medium discharged from the circulating line for the actuator is fed to the corresponding metering orifice by the corresponding individual pressure compensator,
   wherein the directional control valve (i) has an input connection, a tank connector, and two working connections that are configured to be connected to the actuator and (ii) is movable among a blocking position and two working positions,
   wherein the metering orifice is coupled to the directional control valve such that it opens a passage in the two working positions of the directional control valve and shuts off in the blocking position of the directional control valve, and
   wherein a working line in the direction from the metering orifice to the input of the directional control valve is configured to be discharged to the tank in the blocking position of the directional control valve.

2. The control arrangement according to claim 1, wherein:
   an input and a first output of the individual pressure compensator are connected to the circulating line,
   the individual pressure compensator is configured to feed the pressure medium to the metering orifice via a second output of the individual pressure compensator,
   a continuously variable valve body of the individual pressure compensator is acted upon by an input pressure of the metering orifice and configured to move in a first direction towards a flow position in which the input is connected to the first output, and
   the valve body of the individual pressure compensator is acted upon by an output pressure of the metering orifice and configured to move in a second direction towards a branching off position in which the input is connected to the second output, the second direction being opposite the first direction.

3. The control arrangement according to claim 1, wherein the pump is a variable pump.

4. The control arrangement according to claim 3, wherein a transport volume of the variable pump is configured be adjusted by an electrical control device and by an electrical actuator.

5. The control arrangement according to claim 4, wherein volumetric flow demands of the actuators are stored in the electrical control device as a function of a respective target signal.

6. The control arrangement according to claim 4, wherein volumetric flow demands of the actuators are stored in the electrical control device as a function of an adjustment of the associated metering orifices, and wherein position sensors are arranged at the metering orifices.

7. The control arrangement according to claim 3, wherein a transport volume of the variable pump is configured to be adjusted depending on a back pressure before a measurement aperture that is disposed in the circulating line between the last individual pressure compensator and the tank.

8. The control arrangement according to claim 7, wherein the transport volume of the variable pump is further configured be adjusted by an electrical control device and by an electrical actuator, the control arrangement further comprising:
   a pressure sensor that is (i) connected to the circulating line between the last individual pressure compensator and the measurement aperture and (ii) electrically connected to the electrical control device.

9. The control arrangement according to claim 7, wherein the transport volume of the variable pump is configured to be hydraulically adjusted by the back pressure.

10. The control arrangement according to claim 1, wherein the directional control valve is a 4/4-directional control valve having a free movement position, and
    wherein the metering orifice is coupled to the 4/4-directional control valve such that it shuts off in the free movement position of the 4/4-directional control valve.

11. The control arrangement according to claim 1, wherein:
    the directional control valve is a 4/4-directional control valve having a free movement position,
    the metering orifice is coupled to the 4/4-directional control valve such that it shuts off in the free movement position of the 4/4-directional control valve, and
    the working line is configured to be discharged to the tank in the free movement position of the 4/4-directional control valve.

12. The control arrangement according to claim 1, wherein the working line is configured to be discharged by a relief valve that is mechanically coupled to or integrated within the directional control valve.

13. The control arrangement according to claim 12, wherein a non-return valve is arranged in the working line between a branching off to the relief valve and the input.

* * * * *